H. OTTMANN.
ART OF MAKING INSULATING BUILDING MATERIAL.
APPLICATION FILED MAR. 28, 1907.
1,028,903.
Patented June 11, 1912.
3 SHEETS—SHEET 1.
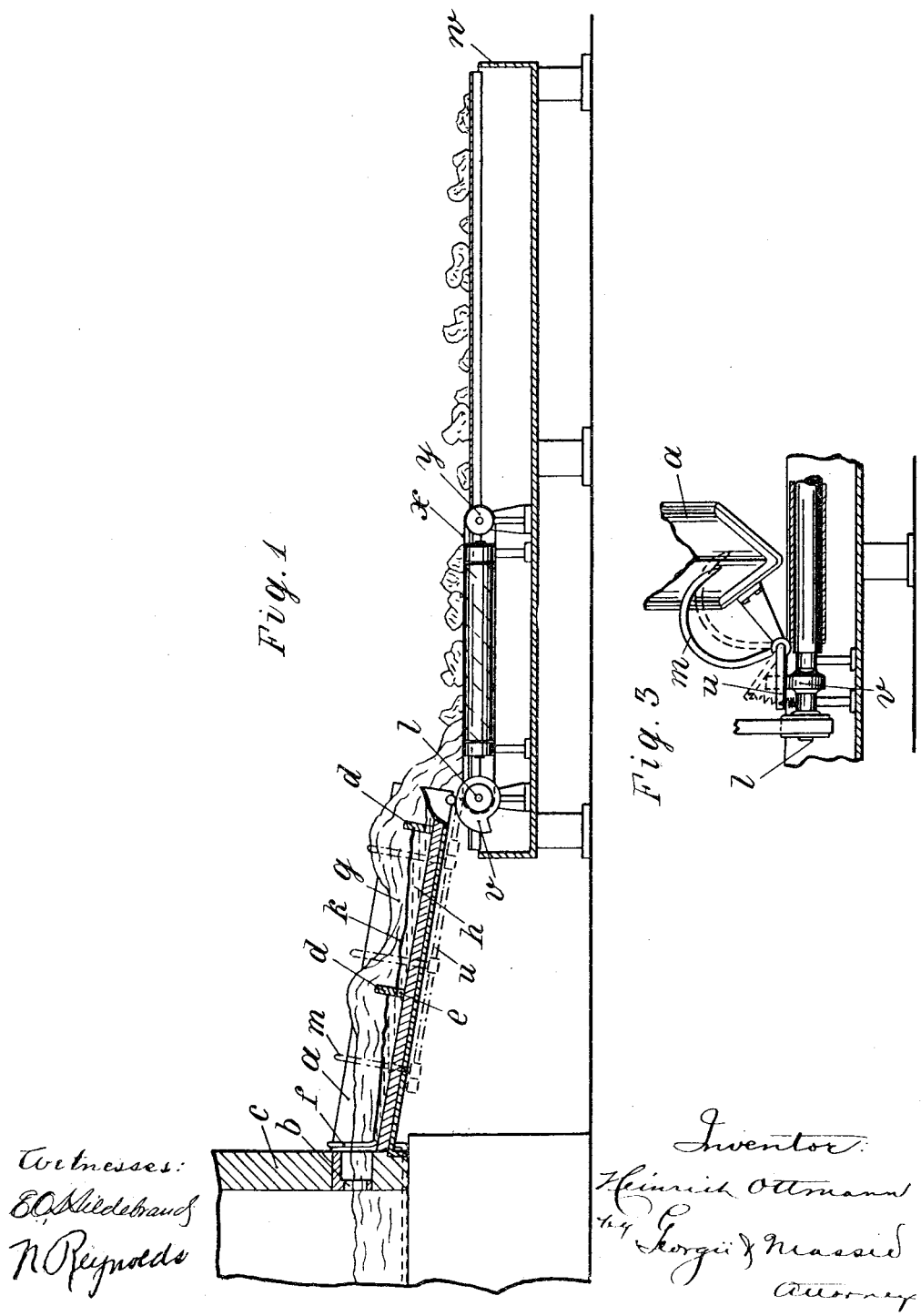

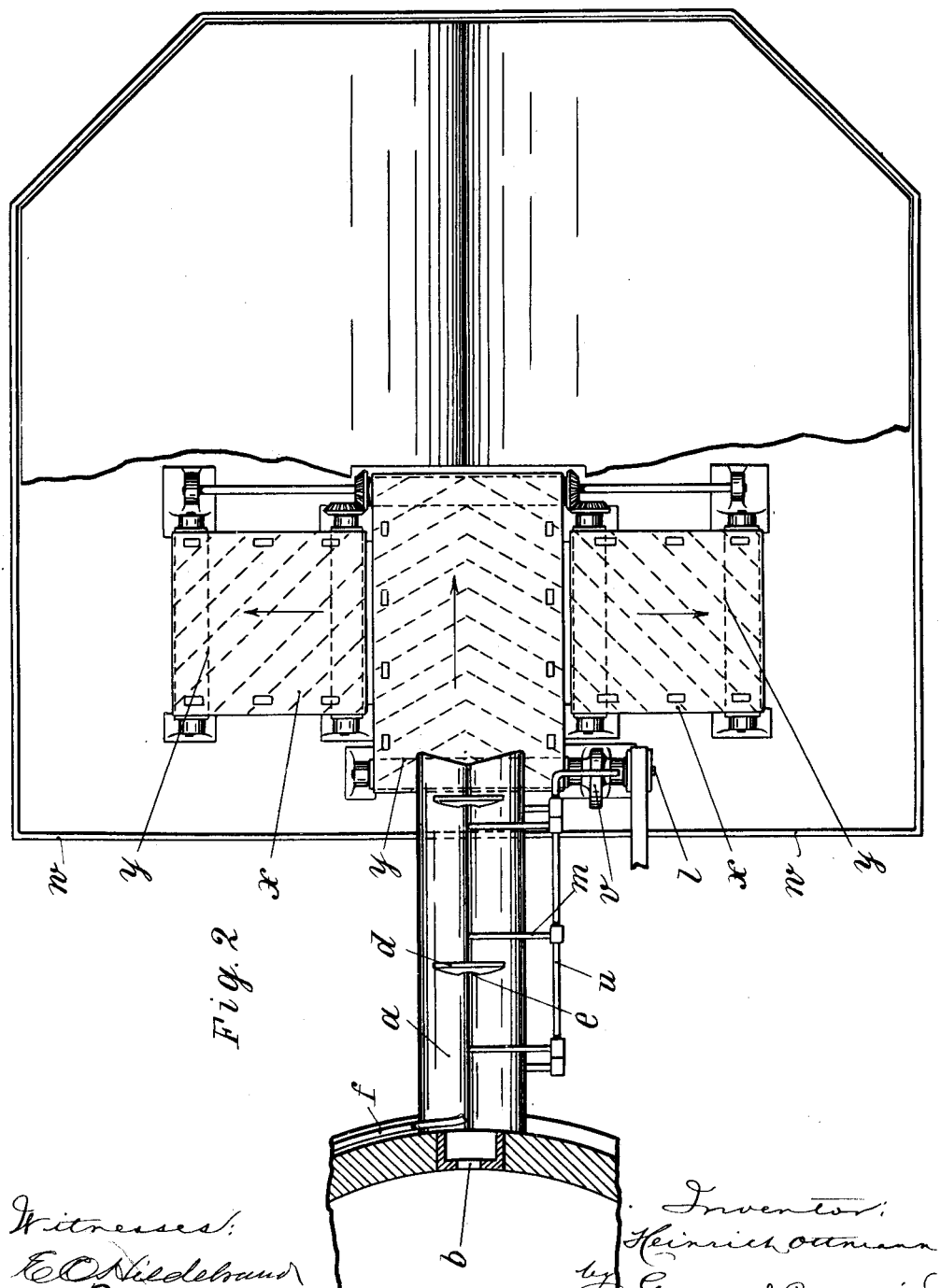

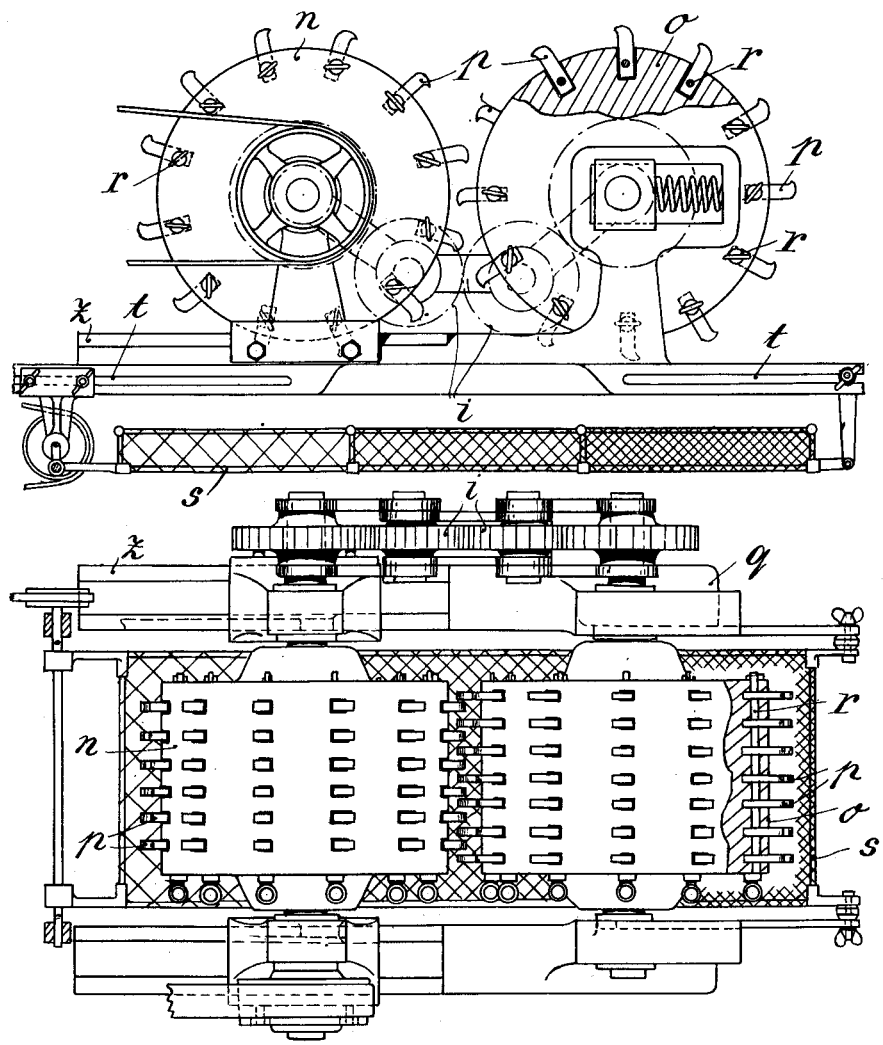

UNITED STATES PATENT OFFICE.

HEINRICH OTTMANN, OF MUNICH, GERMANY.

ART OF MAKING INSULATING BUILDING MATERIAL.

1,028,903. Specification of Letters Patent. Patented June 11, 1912.

Application filed March 28, 1907. Serial No. 365,160.

*To all whom it may concern:*

Be it known that I, HEINRICH OTTMANN, citizen of Germany, residing at Munich, Bavaria, Germany, have invented certain new and useful Improvements in the Art of Making Insulating Building Material; and I do hereby declare the following to be a full, clear, and exact description of the invention, such as will enable others skilled in the art to which it appertains to make and use the same.

My invention relates to the art of making compositions of matter for building and for heat-insulating purposes.

The object of the same is to provide a material for such purposes which shall combine lightness with strength, which will not chemically attack the iron work of structures, e. g. when combined therewith in reinforced concrete construction, and which will form a good sound-deadening and heat-insulating substance in the arts.

For this purpose a material embodying my invention involves the use of puffed or porous blast furnace slag obtained from the charcoal gray-iron process. Such slag differs materially from ordinary slag obtained from the blast furnace process employing mineral coal or coke in being free from the ash constituents of such coal or coke and in particular in being substantially free of sulfur. Therefore, a slag of this character will eliminate the danger of attacking chemically and thereby weakening the iron structural parts in combination with which a compound formed in part of such slag may be used. This puffed slag is exceedingly well suited for the production not only of building but of insulating material. For this purpose, the slag puffed up,—that is, slag having a vesiculated structure, is mixed with a binding material, which may consist, according to the purpose for which the building material is to be employed, of cement, lime, gypsum, asphalt, magnesia, silicates, pitch, tar-products or the like. For example, a building material made from such slag and cement, lime or silicates may be used with advantage for the production of fire-proof masonry such as walls, roofs, floors, plates, for the vaulting in of staircases, the lining of iron construction, the building and insulating of cellars, ice-houses, cold-storage plants, steam boiler coverings and the like. Since this puffed furnace slag has only a very small specific gravity and yet shows a relatively great strength, it is especially suitable also for the production of the lightest kind of masonry, as is required for projections, bay-windows, partition walls and the like, but will serve with advantage for other parts of buildings, particularly in reinforced cement structures. Finally, the material produced according to the present invention has exceedingly good heat-insulating properties, and, therefore, is especially suitable as a heat-insulating material for building and other purposes, in place of cork, infusorial earth, peat-meal and the like.

In my Letters Patent of the United States, No. 1,003,406, dated September 12, 1911, I have described and claimed a method of and an apparatus for producing the puffed substantially sulfur-free slag involved in this invention. For purposes of a complete disclosure I will now describe said process and apparatus, although I do not claim the same herein.

The puffed slag is produced from the slag flowing from the furnace working the gray-iron process, by bringing the incandescent slag into contact with water, which partly vaporizes, or turns into steam at once, the operation being so conducted as to permit a limited amount of steam to enter and change the slag, by blowing or puffing it up, into an immediately congealing porous, intimately vesiculated mass of low specific gravity. This artificial pumice stone, like the natural, is of such low specific gravity as to float on water.

For carrying out this process the apparatus shown in the accompanying drawings is advantageously employed.

In the drawings: Figure 1 is a side elevation, partly in vertical section; Fig. 2 a plan; Fig. 3 a detail end view of a machine for treating the molten slag; Fig. 4 is a side elevation; and Fig. 5 a plan of a crushing and grading device employed by me.

The apparatus consists essentially of a trough or conduit *a* of fire-proof material, which is arranged at a slope in front of the tap-hole *b* of the blast furnace. In the trough itself are placed one or more cross-strips or riffles *d*, which extend upward about two-thirds the depth of the trough and are provided at the bottom with openings *e*. Water is led into this trough, together with the slag, for example, in the present instance below the slag through a conductor or pipe $f$, Figs. 1 and 2, which water may be taken with advantage from the cooling water of the blast furnace.

The operation is as follows: The slag $g$ passes from the blast furnace $c$ through the opening $b$ into the trough $a$ and dams up against the riffles $d$. At the point of contact of the slag $g$, with the water $h$, there is formed at once in consequence of the cooling, a thin glass-like stratum which prevents the molten slag and the water from mixing. The stratum which is indicated in Fig. 1 by thick line $k$, is now perforated by an apparatus, shown in front view in Fig. 3 and driven from a shaft $l$, whereby the hot and partly vaporized water can come into contact with the hot slag and blow or puff it up. In this manner of operation, the mass of slag is provided with a thick, impermeable glassy stratum of considerable mechanical strength next the water, while interiorly the mass remains soft and fluent. Upon perforating this lower crust a limited amount of moisture enters and is converted into a body of steam of relatively great volume which in lieu of escaping through the small water-admitting orifice, permeates the whole mass of semi-liquid slag, converting it into an intimately vesiculated mass as the steam passes upward. With a direct introduction of steam, the mass is not intimately vesiculated but merely contains a few relatively large, bubble-like cavities while the body of the mass remains unchanged. The operation becomes substantially like that of bottle blowing. If the quantity of water be greater than is permitted to enter by the described method of operation, the mass is quickly cooled and simply forms lines of fissures or cracks, without producing the described intimate vesiculation. Upon comminuting such a chilled mass of slag, rough particles are obtained but these are dense and not vesiculated.

In the present example, the apparatus consists of a plurality of teeth or tines $m$, Figs. 1 and 3, which are mounted upon a common axle $u$, suitably journaled adjacent the trough. This is oscillated by means of a cam $v$, keyed upon the shaft $l$ and acting against one end of the axle $u$, which is bent to form a crank-arm as indicated at $u'$, Fig. 3. By this means the entire mass of slag is puffed up or made as porous as possible by the water. Obviously, the perforation or punching of the mass can be done manually, as for example, by picks or the like. The mass is then spread out upon larger sheet metal or similar plates, located in front of the trough in order to solidify thoroughly. In order to obtain a proper sub-division of the mass, endless bands $x$ consisting of wire fabric $o$, and running around rollers or drums $y$, driven by means of bevel gear wheels from the shaft $l$, are arranged at the end of the trough. In the present example, three bands are provided, which move in the direction of the arrows, so that by this arrangement a rapid cooling and subdivision of the mass can take place upon a sheet-metal plate which is advantageously sloped slightly.

Since the pieces of puffed slag are of irregular size and therefore, without further treatment, unsuitable for most building purposes, they should be broken into pieces of substantially equal size in a crushing machine of any suitable kind. A machine of this kind especially suitable for this purpose is shown for example in Fig. 4 in side elevation and in Fig. 5 in plan. As will be seen from these views, the machine consists of two rolls, $n$ and $o$, which are provided with breaking teeth $p$ and journaled in a housing $q$. In order to be able to adjust the rolls to the desired size of lumps, the roll $n$, which is driven in a suitable manner, is mounted upon a support $z$, and arranged to be adjusted along said support and secured thereto at any desired position, motion being transmitted to the other roll $o$ through suitable gears $i$, as will be clear from the drawings.

The roll $o$ is advantageously mounted yieldingly, as for example, by placing springs behind its journal boxes, which are slidably mounted, as shown, whereby all danger of damage to the rolls and particularly to the teeth from hard bodies, such as pieces of iron, is avoided, since the roll $o$ can yield and allow such hard bodies to pass through.

The teeth are removable and arranged in several series or rows. Preferably these teeth are given the form shown in the drawing and have about half their length let into suitable recesses or sockets in the rolls. The teeth $p$ of a row parallel to the axis are advantageously mounted upon a common bar $r$, which can be removably inserted into the roll, so that upon any breakage occurring, the teeth can be readily and easily removed and replaced by others.

Beneath the crusher is located a shaking sieve $s$ which has several divisions of different sized, but large, mesh for the purpose of sorting the crushed material according to the different sizes of the lumps.

In order to be able to position the sieve according to the adjustment of the crushing rolls, the said sieve is arranged to be adjustable longitudinally in grooves $t$ and can be fixed in any adjusted position.

The apparatus and process hereinabove described for purposes of a full disclosure of the invention is not claimed herein, but is claimed in my above Letters Patent of the United States No. 1,003,406, granted on an application pending concurrently with this application.

According as the material obtained in the above way is to be employed as building or as insulating material, it is mixed as already explained, with suitable binding material, such as cement, gypsum, asphalt or the like for building material, or with silicate, pitch or the like for insulating material.

In making the mixture, the materials must be thoroughly incorporated and then finally brought into the desired form under pressure, the pressure being maintained until the materials harden or set.

Preferably four to ten parts of the crushed porous slag are mixed with about one part of the binding material. If the body thus obtained is not water-proof, as for example, is the case when cement is employed as a binding material, it can be made water-proof by coating or saturating it with a water-proofing material such as asphalt, pitch, tar and the like. The body so obtained is remarkable for its exceedingly great porosity and, therefore, its low specific gravity, which is less than that of water, and is generally much less than one-fourth of such specific gravity. It contains or incloses a certain quantity of dead air, whose presence essentially adds to the insulating properties of the material. Insulating bodies of this kind which are made with the help of cement or silicates are especially resistant against the influences of the atmosphere, water and fire.

A compound prepared according to this invention has combined great strength with lightness, the weight of the same per cubic yard being only a small fraction of that of the concrete compounds usually employed for structural work, and reinforced cement. Thereby, in the case of steel frame building structures, the weight of all supporting beams, girders, columns and other metal parts may be materially diminished, which results in a great reduction of cost of such structures. Moreover, since the slag composing my new composition of matter is from the charcoal gray iron smelting process, and is hence free from iron, it is manifest that a great drawback which has made the use of cinders, ashes and similar substances undesirable on account of their destructive effect on iron and steel structural work, is removed by the new compound. This sulfur-free slag does not attack iron or steel and a concrete comprising the same can, therefore, be used in connection with iron or steel without any danger of corrosive or chemical destructive action thereon.

What I claim and desire to secure by Letters Patent is:—

The process of producing an insulating and building material which consists in floating incandescent blast-furnace slag upon water while simultaneously perforating the lower crust forming upon the mass, whereby the slag will be puffed and intimately vesiculated, comminuting the puffed slag, mixing the comminuted puffed slag with a binding material, and forming the mixture into shape.

In testimony whereof I hereunto affix my signature in the presence of two witnesses.

HEINRICH OTTMANN.

Witnesses:
ABRAHAM SCHLESINGER,
LOUIS T. MUELLER.